Nov. 4, 1952 — T. H. THOMAS ET AL — 2,616,536
CLUTCH CONTROL MECHANISM
Filed Oct. 20, 1948 — 2 SHEETS—SHEET 1

INVENTORS
THOMAS H. THOMAS
EDWARD E. HUPP
WILLIAM R. WILLIAMS
BY H. O. Clayton
ATTORNEY Nov. 4, 1952  T. H. THOMAS ET AL  2,616,536
CLUTCH CONTROL MECHANISM
Filed Oct. 20, 1948  2 SHEETS—SHEET 2
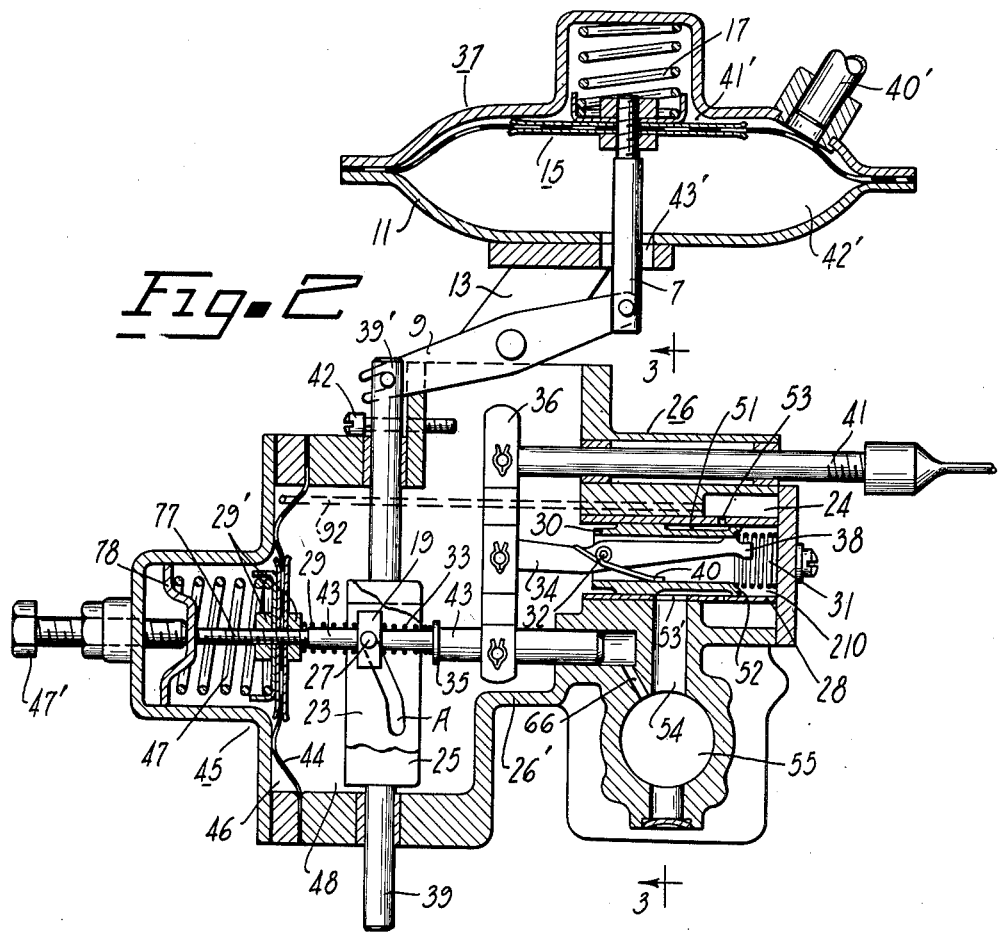
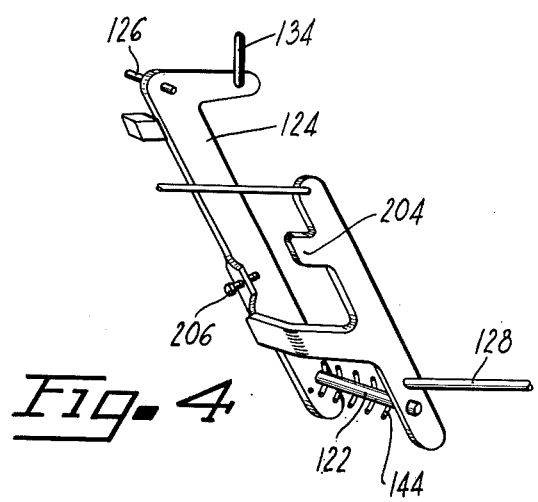
INVENTORS
THOMAS H. THOMAS
EDWARD E. HUPP
WILLIAM R. WILLIAMS
BY H. O. Clayton
ATTORNEY Patented Nov. 4, 1952

2,616,536

UNITED STATES PATENT OFFICE 2,616,536

CLUTCH CONTROL MECHANISM

Thomas H. Thomas, Edward E. Hupp, and William R. Williams, South Bend, Ind., assignors to Bendix Aviation Corporation, South Bend, Ind., a corporation of Delaware Application October 20, 1948, Serial No. 55,604

8 Claims. (Cl. 192—.075)

This invention relates in general to power means for operating the friction clutch of an automotive vehicle and in particular to pressure differential operated power means controlled by an operation of the accelerator of the vehicle and by an operation of either a vehicle speed responsive governor or the change speed transmission of the vehicle.

Another object of our invention is to provide, in the power plant of an automotive vehicle including a friction clutch, a change speed transmission and an accelerator, a vacuum operated clutch control mechanism comprising a single acting motor, said motor being controlled by a three-way follow-up valve which is actuated, through the intermediary of a floating lever, by the accelerator and a pressure differential and spring operated motor; and a further and important object of our invention is to so regulate the operation of the latter motor that the mechanism of our invention operates to determine the loading of the clutch plates when and if the degree of vacuum of the intake manifold of the engine of the vehicle reaches either one or the other of two critical factors.

A further object of our invention is to provide power means adapted to operate the friction clutch of an automotive vehicle said power means including a fluid pressure motor operative when the vacuum of the intake manifold of the vehicle reaches either one or the other of two factors, to operate a control valve to correct an improper clutch engaging operation of said power means.

A further object of our invention is to provide, in an automotive power plant including a friction clutch, a clutch control mechanism including a motor and valve means for controlling the operation of said motor, said valve means comprising an accelerator and motor operated three-way valve the normal operation of said valve being at times overruled by an intake manifold vacuum operated motor to effect the desired engagement of the clutch.

Yet another object of our invention is to provide a clutch control mechanism including a balanced type of control valve said mechanism being operable to effect a smooth engagement of the clutch, a slipping clutch, that is, heavily loaded clutch, engaging operation of the mechanism being automatically corrected during the operation of the mechanism.

Yet another object of the invention is to provide power means for operating the friction clutch of an automotive vehicle, said power means including a pressure differential operated motor and a simple and compact valve unit for controlling the operation of said motor, said unit being located remotely from said motor and including a pressure balanced accelerator and motor operated three-way valve, together with supplementary means for actuating the three-way valve to automatically correct an undesirable engagement of the clutch, for example, a slipping of the clutch, said supplementary means including means operable by virtue of the vacuum in the intake manifold of the vehicle.

A further object of our invention is to provide, in an automotive vehicle including an internal combustion engine, an engine controlling throttle, and a friction clutch; a clutch control mechanism including a motor, a valve for controlling the operation of said motor, means for operating said valve, and valve controlling means operative to overrule the valve operating means and coming into play to control the valve when, with a certain throttle opening, the engine speed is higher or lower than the optimum engine speed.

The above and other objects and features of the invention will appear more fully hereinafter from a consideration of the following description taken in connection with the accompanying drawings wherein one embodiment of the invention is illustrated by way of example.

Figure 2 is a longitudinal sectional view of the control valve mechanism of our invention;

Figure 4 is a view disclosing the principal parts of the connection interconnecting the accelerator, the throttle and the control valve.

Figure 1:
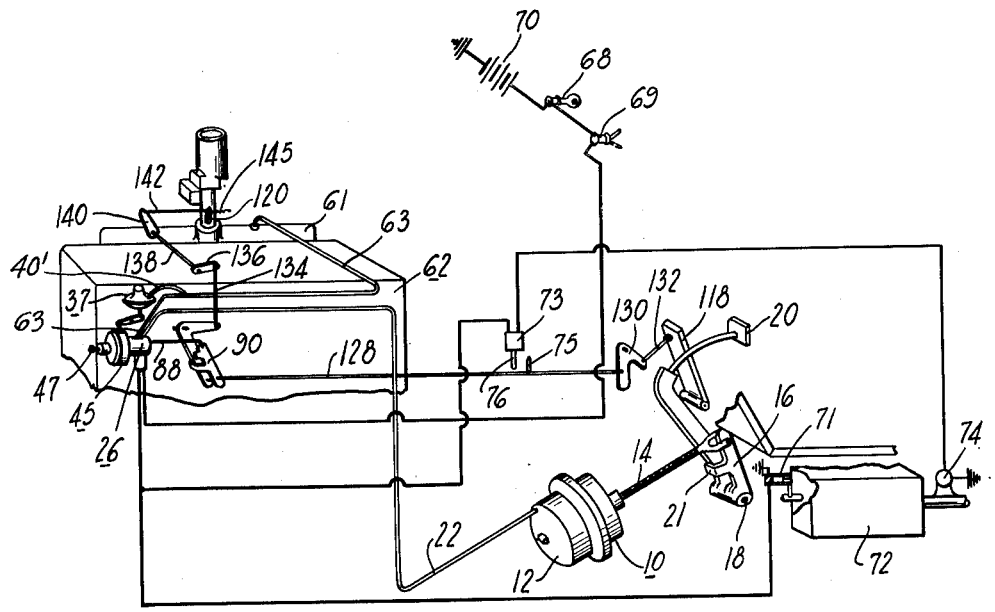
Figure 1 is a diagrammatic view disclosing the principal features of our invention.

Describing now that embodiment of our invention disclosed in the several figures of the drawings the principal elements thereof consist of a single acting vacuum motor 10 comprising a casing 12 and a power element such as a piston, not shown, which is connected to a friction clutch, not shown, of a conventional design. One end of the casing of the motor, a portion of the body thereof and the power element together outline a control chamber, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

Figure 3:
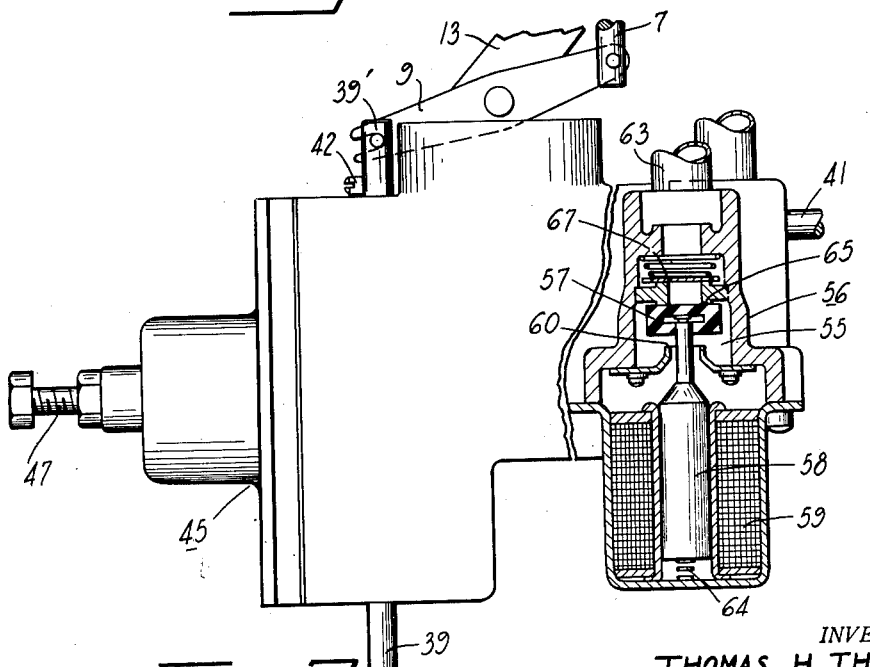
Figure 3 is a view partly in section, taken on the line 3—3 of Figure 2 disclosing details of the solenoid operated vacuum cutin valve of the valve mechanism.

One end of the motor 10, that is, the end of the same constituting a part of the aforementioned power compartment of the motor, is connected by a conduit 22 to a compartment 24 of a control valve unit indicated as a whole by the reference numeral 26 and two different views of said unit are disclosed in Figures 2 and 3 of the drawings. The casing 26' of the unit 26 is provided with a cylindrically shaped bore to receive a cylindrical sleeve valve member 28 constituting one of the two parts of a three-way valve; and said casing is counterbored to provide the aforementioned compartment 24, Figure 2.

A valve member 30, which is biased inwardly by a spring 31 and which is provided with a cylindrically shaped bore to permit the passage of air therethrough, constitutes the other part of the two part three-way valve. One end of the latter valve member, is provided with diametrically spaced openings to receive therethrough a pin 32 and said pin extends through a connecting arm 34, one end of which extends within the member 30. The other end of the arm 34 extends beyond the valve member 30 and is detachably connected to a two-part lever 36. The end portion 38 of the arm 34 is preferably biased into engagement with the interior of the valve 30 by a coil spring 40. There is thus provided means for readily disconnecting valve 30 from the lever 36; for the pin 32 may be removed by driving the same through the arm 34, thereby separating the latter from the valve 30.

As is disclosed in Figure 2, the lever 36 is pivotally connected at one of its ends to a rod 41; and the movement of the rod to the left, Figure 2, is limited by a stop pin 42 adjustably mounted in the valve casing. The other end of the lever 36 is pivotally connected to a pin 43 which is slidably received at one of its ends in a portion of the valve casing and which is secured at its other end to a flexible diaphragm 44. This diaphragm constitutes the power element of a valve operating pressure differential operated motor indicated as a whole by the reference numeral 45; and the operation of said motor is in large measure controlled by the gaseous pressure within the control compartment 46 of said motor, and by a compression spring 47 within said compartment. The motor 45 cooperates with a manifold vacuum operated motor 37 in the operation of the valve operating pin 43, the motor 37 constituting the essence of our invention. The load exerted by the spring 47 upon the diaphragm 44 is determined by the adjustment of a set screw 47'.

The valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve and is also operated to interconnect said ports with the air cleaner 50 via the compartment 48 and the interior of the valve.

The valve member 28 is provided with an opening 53' to register with one end of a duct 54 in the valve casing, said duct registering at its other end with a chamber 55 of a three-way vacuum cutin valve indicated as a whole by the reference numeral 56 and disclosed in detail in Figure 3. The latter valve includes a valve member 57 secured to one end of an armature 58 of a solenoid 59. When the solenoid 59 is energized the valve member 57 moves downwardly, Figure 3, to seat at 60, thereby connecting the duct 54 with the intake manifold 61 of the internal combustion engine 62 of the vehicle via a conduit 63 and the aforementioned chamber 55; and when the solenoid 59 is de-energized, a spring 64 serves to move the armature upwardly, Figure 3, to seat the valve member 57 at 65, thereby cutting off the vacuum connection and venting the duct 54 to the atmosphere via the air cleaner 50, chamber 48 of the motor 45, the recess in the valve casing which houses the outer end of the pin 43, a duct 66 in the valve casing, and the chamber 55. A spring loaded check valve 67 may be included in the vacuum connection between the intake manifold and the valve chamber 55 thereby providing a means for maintaining the clutch disengaged in the event the conduit 63 is broken or otherwise vented to the atmosphere when the motor 10 is energized.

Completing the description of the valve unit 26 the casing 26' is provided with a duct 92, Figure 2, permanently interconnecting the control compartment 46 of the motor 45 with the aforementioned valve compartment 24. There is thus provided fluid transmitting means for at all times interconnecting the motor compartment 46, the valve compartment 24, and the control compartment of the clutch operating motor 10. It follows therefore that the operation of the clutch control mechanism constituting our invention is controlled by controlling the gaseous pressure within the valve compartment 24.

Describing now the most important feature of our invention, that is, the valve operating motor 37 and its connection with the valve operating pin 43, said motor includes a two part casing 11 secured to the casing of the motor 45 by a bracket 13. The power element of the motor 37 is indicated by the reference numeral 15; and a spring 17, interposed between said power element and a portion of the motor casing 11, serves to bias said power element downwardly, Figure 2.

The force transmitting means interconnecting the power element 15 with the pin 43 constitutes one of the features of our invention and preferably includes a trunnion block 19. A relatively short pin, not shown, extending from one face of the block 19 extends within a cam slot A in a plate 23. The latter plate constitutes one side of a rectangular shaped box like cam member, a top plate 25 of said cam member being provided with a cam slot, not shown, which duplicates and is positioned immediately above and in line with the cam slot A. A pin 27, extending from the trunnion block 19 and diametrically opposite the aforementioned pin, extends within the cam slot in the member 25. The pin 43 extends through an opening in the trunnion block 19 and compensator springs 29 and 33 sleeved over the pin 43 provide yieldable force transmitting means interconnecting the trunnion block with said pin. The spring 29 is spaced between the trunnion block and a nut 29' mounted on the pin 43; and the spring 33 is spaced between the trunnion block and a stop 35 secured to said pin. As is disclosed in Figure 2 pins 39 and 39', connected to and extending from the cam member 23, 35, are slidably mounted in the casing of the motor 45; and a lever 9 and pin 7 secured to the power element 15, serve to connect said power element with the pin 39'.

Completing the description of the manifold vacuum operated control mechanism of our invention, a conduit 40', connected to a controlling compartment 41' of the motor 37, is connected to the conduit 63 which is connected to the intake manifold 61 of the internal combustion engine 62; and a compartment 42' of said motor is vented to the atmosphere by a port 43' in the casing of the motor.

Describing now the operation of the motor 37, the parts of the mechanism of our invention, including the tension of the springs 29 and 33, the cam mechanism and the remainder of the force transmitting means interconnecting the power element 15 and the pin 43, are so constructed and arranged that with all normal operations of the internal combustion engine, the clutch and the accelerator, the motor 37 and the springs 29 and 33 connected therewith play no part in the control of the three-way valve 28, 30; however, for example, should the clutch slip appreciably during the engagement thereof thereby speeding up the engine, there would result a higher than normal intake manifold vacuum; and when this vacuum reaches a certain critical factor the motor 37, as explained hereinafter, is operative to operate the valve member 30 to effect an operation of the motor 10 to increase the loading of the clutch plates. For example, such a slipping of the clutch would occur if the co-efficient of friction of the clutch lining should be suddenly changed. The increase in intake manifold vacuum to the critical factor would then result in an upward movement of the power element 15 by virtue of the relatively high differential of pressures to which said element would be then subjected; and said upward movement would result in a loading of the compensator spring 29 thereby moving the pin 43 to the left, Figure 2. This operation serves to operate the valve 28, 30 to admit air to the compartment 46 of the motor 45 and to the clutch operating motor 10; and the latter operations result in an increase in clutch plate loading thereby slowing down the engagement of the clutch with a consequent reduction in the intake manifold vacuum; and this reduction in intake manifold vacuum serves to operate the motor 37 to destroy the aforementioned valve operating load exerted by the spring 29 thereby permitting the spring 47 to further expand to lap the valve 28, 30.

Describing another feature of the motor 37, if the internal combustion engine 62 should labor as a result of an excessive loading of the clutch plates as the clutch is being engaged, then the resulting abnormal decrease in intake manifold vacuum to another critical factor will result in an expansion of the spring 17 of the motor 37; and this operation results in a loading of the compensator spring 33 with a resultant operation of the valve 28, 30 to energize the clutch motor 10 to disengage the clutch. A slight disengagement of the clutch will result thereby effecting the desired speeding up of the engine; and the latter operation will increase the intake manifold vacuum thereby energizing the motor 37 to destroy the load then exerted by the spring 33 and permit diaphragm 44 to operate to lap the valve 28, 30.

There is thus provided, by the vacuum operated motor 37, means for operating the valve 28, 30 to effect the desired engagement of the clutch, said motor coming into play to overrule the normal operation of said valve when and only when the clutch is being improperly engaged. Expressed in other words if, with a certain throttle opening, the engine speed is higher or lower than the optimum engine speed then the pressure differential motor and spring operated power means comes into play to effect the desired engagement of the clutch.

Describing now the force transmitting means interconnecting the accelerator 118 of the car with a throttle operating crank 120 and with the valve operating pin 41, said pin is connected to a rod 88 and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145, is operative, together with the spring 145, to return the accelerator to its throttle closed position and to move the valve member 30 to the right, Figure 2, to open the three-way valve, that is, operate the same to effect a clutch disengaging operation of the motor 10. The spring 144 is preferably sleeved over the pin 122 and is connected at its ends to the levers 90 and 124. The operation of this part of the mechanism of our invention will be described in greater detail hereinafter when the operation of the entire clutch control mechanism is described in detail.

Describing now an important feature of the mechanism of Figure 1, the solenoid 59 which operates the vacuum cutin valve 56, is controlled by the electrical controls disclosed in said figure. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of the transmission 72 when the transmission is established in its high gear setting. With this electrical hookup the valve 56 is opened, that is, the valve member 57 is seated at 60, when the switches 68 and 69 are closed and the transmission is established in any gear except high gear; accordingly, with the vacuum cutin valve opened there is provided a source of vacuum to make possible a clutch disengaging operation of the motor 10 when the accelerator is released to open the valve 28, 30, an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic; and to effect this operation of the mechanism of our invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

Describing now the complete operation of the mechanism constituting our invention and incidentally completing the description of the parts thereof not heretofore described, when the accelerator 118 is released to close the throttle and idle the internal combustion engine 62, the intake manifold 61 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. The valve member 30 and the means for operating the same then assume the relative positions disclosed in Figure 2, the end portion 77 of the pin abutting a stop 78 pressed in from the wall of the valve housing. Air is then withdrawn from the clutch motor and the motor compartment 46 into the intake manifold via the conduit 63, the valve compartment 55, the duct 54 interconnecting the compartment 55 with the port 53', Figure 2, recess 51, ports 53, the compartment 24, the duct 92 interconnecting the compartment 24, with the valve motor compartment 46, and the conduit 22 interconnecting the compartment 24 with the control chamber of the clutch motor 10.

The compartment 46 being then partially evacuated the diaphragm 44 is moved, by the differential of pressures acting on the same, to the position disclosed in Figure 2; for the gaseous pressure within the compartment 46 is at this time the same as that within the intake manifold of the idling engine and this gaseous pressure is of course the same as that within the control compartment of the then energized clutch operating motor 10. It is to be noted that in this clutch disengaged position of the parts the valve member 30 is moved to the left, Figure 2, to a position just short of a closing off of the ports 53 by the flanged end of said valve member, that is, the land 52.

Now it is to be noted that the air transmitting connection with the intake manifold is made possible by virtue of the fact that the valve member 57 of the vacuum cutin valve unit 56 is at the time removed from a seat 65; for the solenoid 59 which actuates said valve member is at the time energized to move the armature 58 and the valve member 57 connected thereto downwardly, Figure 3. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch 74 thus completing an electrical circuit including the switch 74, the then closed accelerator operated switch 73, the solenoid 59, the cutout switch 69, the ignition switch 68 of the vehicle and the grounded battery 70.

It is also to be noted at this juncture that when the valve operating motor 45 is energized the movement to the left, Figure 2, of the diaphragm 44 of said motor not only serves to move the valve member 30 to the position disclosed in said figure but also serves to compress the spring 47; and as will be described hereinafter the degree of compression of said spring, determined by the operation of the power element 44, constitutes a factor in the control of the valve to effect the stage operation of the clutch operating motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 2, to rotate the lever member 36 about its pivotal connection with the pin 43 as a fulcrum. The valve member 30 is thus moved to the left, Figure 2, the lever 36 operating as a lever of the second class to place the valve ports 53 in communication with a valve chamber 210 which chamber is at all times connected to the atmosphere via the interior of the valve member 30 and the valve compartment 48 which is at all times vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 30 having been moved to the left to vent the valve compartment 24 to atmosphere there results a relatively rapid flow of air into both the control compartment of the clutch operating motor 10 and the compartment 46 of the valve operating motor 45; and this flow of air results in a clutch engaging operation of the motor 10. Describing this operation the power element of the motor 10 is moved to the right, Figure 1, by the clutch springs and when said springs have expanded sufficiently to bring the clutch plates just short of engagement with each other, the movement of the power element is arrested.

Explaining this arresting operation the clutch spring, by its expansion, serves to maintain a relatively low gaseous pressure, that is vacuum, within the control chamber of the motor 10. Now inasmuch as said control chamber is at all times connected to the valve chamber 24 and motor chamber 46 it follows that the gaseous pressure within said chambers is also maintained relatively low by virtue of the expansion of the clutch springs. As described above, when the clutch springs have expanded a certain amount, that is, when their vacuum creating pulling power has decreased to a certain factor, then the spring 47 automatically moves to the right, Figure 2, that is, expands, thereby lapping the three-way valve 28, 30. Describing this operation of said valve the valve member 30 moves to the right until the ports 53 register with the land portion 52 of said valve member; and when this occurs the flow of air into the chamber 46 and the motor 10 is automatically cut off and the system is then in equilibrium.

In this operation the lever 90 rotates counter-clockwise about the pivotal connection between the pin 122 and said lever, said pivotal connection acting as a fulcrum. As stated above, the parts of the mechanism of our invention are so constructed and arranged, particularly the strength or load of the clutch springs, the area of the diaphragm 44 and the tension of the spring 47, that the valve is lapped to arrest the movement of the power element of the clutch motor when the clutch plates are just short of contact with each other. As is described above the valve operating springs 29 and 33 do not impede the movement of the pin 43 in effecting this operation of the valve.

This operation of the motor 10 is usually described as the first stage operation thereof and it is to be particularly noted that by varying the tension of the spring 47 that the termination of the first stage operation of the motor may be varied. In other words, by varying the tension of the spring 47 there is provided means for varying the degree of separation of the clutch plates when the first stage of clutch engaging operation of the motor 10 is completed. It is also to be noted that the mechanism of our invention is preferably so constructed that this first stage of clutch engaging operation of said motor is completed before or at substantially the same time as the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby increasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47 there being no resistance or substantially no resistance from the springs 29 and 33 to said expansion. In this valve lapping operation the direction of movement of the valve member 30 is again reversed, the lever 36 fulcruming about its connection with the pin 41. As with the above described first stage of clutch engaging operation of the mechanism the spring 47 expands to move the valve member 30 to its lapped position when the differential of pressure acting on the diaphragm 44 is reduced to a certain factor by the flow of air into the chamber 48. As with the first stage operation of the mechanism, the valve is lapped when the force exerted by the spring 47 equals the force exerted by the diaphragm 44.

The clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is the operation to effect the relatively rapid movement of the clutch plates up to a point just short of engagement with each other, will, by virtue of the relatively fast movement of the valve member 30 and its degree of movement during the initial increment of movement of the accelerator, be effected very quickly. The second stage clutch engaging operation of our clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed before or at substantially the same time as the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

There is thus provided, by the friction clutch control mechanism of our invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In this clutch disengaging operation of the power means the accelerator, in its operation of the three-way valve 28, 30, cooperates with the governor in its operation of closing the switch 74 and the accelerator 118 in its operation of closing the switch 73. As to the clutch engaging operation of the power means of our invention, said operation is effected, through the intermediary of the floating lever 36, by an operation of the accelerator and an operation of the valve operating motors 45 and 37 the latter being the most important feature of our invention. It is also to be noted that with the clutch control mechanism of our invention if the driver should fail to depress the accelerator to operate the valve 28, 30 just after the transmission is established in its high gear setting, that the bleed of air into the motor 10 via the duct 66 will nevertheless insure an engagement of the clutch. This operation of the mechanism might be effected if the transmission were placed in its high gear setting just before the vehicle started to descend a grade.

The valve mechanism of our invention insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated pin 41 and the power element 44 of the valve operating motor 45, provide a very simple, yet effective, means for operating the three-way control valve 28, 30; the varying of the tension of the spring 47 provides a means for determining when the first stage of engagement of the clutch is completed; the particular force transmitting means interconnecting the throttle valve, the valve member 30 and the accelerator 118 insures a completion of the first stage of engagement of the clutch just as the throttle is opened or is about to be opened; and the step by step clutch engaging or disengaging operations of the power element of the clutch motor insures the desired maneuvering of the vehicle in traffic or when the vehicle is being parked. However the most important feature of our invention lies in the operation of the spring and vacuum operated motor 37; for as described above should the clutch be improperly engaged the motor 37 will automatically come into play to operate the valve 28, 30 to effect the desired clutch engaging operation of the motor 10. In this operation the motor 37 overrules the valve operating operation of the motor 45.

Although only one embodiment of the invention has been illustrated and described, various changes in the form and relative arrangements of the parts may be made to suit requirements.

We claim:

1. Power means adapted to operate the friction clutch of an automotive vehicle comprising a pressure differential operated motor the power element of which is adapted to be connected to said clutch and a control compartment of which is adapted to be connected to a source of vacuum, means for controlling the operation of said motor including a valve, means for operating said valve including a pressure differential and spring operated motor, and means for overruling the valve controlling operation of the latter motor to effect the desired engagement of the clutch including a pressure differential and spring operated motor operable at a certain critical vacuum factor of the source of vacuum.

2. Power means adapted to operate the friction clutch of an automotive vehicle comprising a pressure differential operated motor the power element of which is adapted to be connected to said clutch and a control compartment of which is adapted to be connected to a source of vacuum, means, including a three-way valve, for controlling the operation of said motor, means for operating said three-way valve including a pressure differential and spring operated motor, and means for overruling the valve controlling operation of the latter motor to thereby effect the desired engagement of the clutch, said overruling means including a spring and pressure differential operated motor operable at a certain critical vacuum factor of the source of vacuum.

3. In an automotive vehicle provided with an internal combustion engine having an intake manifold, an accelerator, and a friction clutch; power means for operating the clutch including a pressure differential operated motor, valve means, including a three-way valve, for controlling the operation of said motor, means for operating said three-way valve including an accelerator operated force transmitting means and a spring and fluid pressure operated motor, and means, operable in accordance with the vacuum of the intake manifold, for overruling the clutch engaging operation of the valve operating motor to thereby effect the desired clutch engaging operation of the pressure differential operated motor, said motor overruling means coming into play only when the intake manifold vacuum reaches a certain critical vacuum factor during the clutch engaging operation of the clutch operating motor.

4. In an automotive vehicle provided with an internal combustion engine having an intake manifold, an accelerator, and a friction clutch; power means for operating the clutch including a pressure differential operated motor, valve means for controlling the operation of said motor, means for operating said valve means including an accelerator operated force transmitting means, a motor, and force transmitting means, comprising a floating lever, interconnecting the valve means, the accelerator operated force transmitting means and the valve operating motor, and means, operable in accordance with the vacuum of the intake manifold, for overruling the clutch engaging operation of the valve operating motor to thereby effect the desired clutch engaging operation of the pressure differential operated motor, said valve overruling means coming into play only when the intake manifold vacuum reaches a certain critical vacuum factor during the clutch engaging operation of the clutch operating motor.

5. In an automotive vehicle provided with an intake manifold and a friction clutch, power means for operating the clutch including a fluid pressure motor, means, including a valve, for controlling the operation of said motor, means for operating said valve, and normally inoperative means, operative when and if the degree of intake manifold vacuum reaches a certain critical vacuum factor during a clutch engaging operation of the power means, for overruling the valve operating means to thereby correct the operation of the power means and effect the desired engagement of the clutch.

6. In an automotive vehicle provided with an intake manifold and a friction clutch, power means for operating the clutch including a fluid pressure motor, a valve for controlling the operation of said motor, means, including a floating lever member, for operating said valve, and normally inoperative means, operative when and if the degree of intake manifold vacuum reaches a certain critical vacuum factor during a clutch engaging operation of the power means, for overruling the valve operating means to thereby correct the operation of the power means and effect the desired engagement of the clutch.

7. In an automotive vehicle provided with a friction clutch, a carburetor including a throttle valve, an accelerator for operating said throttle valve, and an internal combustion engine having an intake manifold the degree of pressure of the gas within said manifold being in large measure determined by the speed of the engine and the degree of opening of the accelerator operated throttle valve; power means for operating the clutch including a pressure differential operated motor, fluid transmitting connections interconnecting said motor with the intake manifold, a valve, comprising a movable valve member, for controlling the operation of the motor, means for operating said valve including a floating lever, force transmitting means interconnecting said lever and movable valve member, force transmitting means interconnecting the accelerator and lever, a valve operating fluid pressure motor, and force transmitting means interconnecting the latter motor and lever; together with means, operative in accordance with the vacuum within the intake manifold, for at times overruling the operation of the latter fluid pressure motor in its control of the valve, said overruling means including a pressure differential operated motor, fluid transmitting means connecting said motor and intake manifold and force transmitting means interconnecting the latter motor and the force transmitting means interconnecting the valve operating motor and valve.

8. In an automotive vehicle provided with a friction clutch, a carburetor including a throttle valve, an accelerator for operating said throttle valve, and an internal combustion engine having an intake manifold the degree of pressure of the gas within said manifold being determined by the speed of the engine and the degree of opening of the throttle valve; power means for operating the clutch including pressure differential operated motor, fluid transmitting connections interconnecting said motor with the intake manifold, a valve, comprising a movable valve member, for controlling the operation of the motor, means for operating said valve including a floating lever, force transmitting means interconnecting said lever and movable valve member, force transmitting means interconnecting the accelerator and lever, a fluid pressure motor, and force transmitting means interconnecting the latter motor and lever; together with means, operative in accordance with the vacuum within the intake manifold, for at times overruling the operation of the latter fluid pressure motor in its control of the valve said overruling means including a fluid pressure and spring operated motor, fluid transmitting means connecting said motor and intake manifold and force transmitting means, including a cam member and a trunnion block fitting within said cam member, interconnecting the latter motor and the force transmitting means interconnecting the fluid pressure motor and movable valve member.

THOMAS H. THOMAS.
EDWARD E. HUPP.
WILLIAM R. WILLIAMS.

REFERENCES CITED

The following references are of record in the file of this patent:

UNITED STATES PATENTS

| Number | Name | Date |
|---|---|---|
| 2,049,738 | Hill et al. | Aug. 4, 1936 |
| 2,219,269 | McCollum et al. | Oct. 22, 1940 |
| 2,296,282 | Hruska | Sept. 22, 1942 |
| 2,320,182 | Hill et al. | May 25, 1943 |